United States Patent
Polidi

(12) 
(10) Patent No.: US 6,622,086 B2
(45) Date of Patent: Sep. 16, 2003

(54) METHOD OF REPRESENTING A LOCATION IN A DATABASE FOR A VEHICLE NAVIGATION SYSTEM

(75) Inventor: Ari Israel Polidi, Mountain View, CA (US)

(73) Assignee: Horizon Navigation, Inc., Santa Clara, CA (US)

( * ) Notice: Subject to any disclaimer, the term of this patent is extended or adjusted under 35 U.S.C. 154(b) by 0 days.

(21) Appl. No.: 10/074,853

(22) Filed: Feb. 11, 2002

(65) Prior Publication Data

US 2003/0154020 A1 Aug. 14, 2003

(51) Int. Cl.[7] .............................................. G01C 21/32
(52) U.S. Cl. ..................... 701/208; 701/25; 701/201; 701/211; 701/212; 340/995.19
(58) Field of Search ................................. 701/201, 208, 701/211, 212, 25; 340/995, 995.19

(56) References Cited

U.S. PATENT DOCUMENTS

| 5,908,465 | A | 6/1999 | Ito et al. ...................... 701/211 |
| 6,081,803 | A | 6/2000 | Ashby et al. ................... 707/4 |
| 6,092,076 | A | 7/2000 | McDonough et al. ....... 707/102 |
| 6,128,571 | A | 10/2000 | Ito et al. ...................... 701/201 |

FOREIGN PATENT DOCUMENTS

EP    0 838 663 A3    3/2000

*Primary Examiner*—Gertrude Arthur
(74) *Attorney, Agent, or Firm*—Blakely, Sokoloff, Taylor & Zafman LLP

(57) ABSTRACT

A method of representing a point of interest, a destination, or an address in a database for a navigation system for a vehicle by a plurality of points to militate against a driver not being notified upon arrival at the point of interest, the destination, or the address.

16 Claims, 3 Drawing Sheets

US 6,622,086 B2

METHOD OF REPRESENTING A LOCATION IN A DATABASE FOR A VEHICLE NAVIGATION SYSTEM

FIELD OF THE INVENTION

The invention relates to a navigation system for a vehicle and more particularly to a navigation system including a method of representing a point of interest, a destination, or an address within a database using a plurality of points.

BACKGROUND OF THE INVENTION

A navigation system for a vehicle has become increasingly popular as an accessory in the vehicle. The navigation system assists a driver by locating a point of interest, a destination, or an address, and providing other useful information.

In a typical navigation system, the point of interest, the destination, or the address are represented by a single point in a database included in the navigation system computer. A problem created by representation by a single point is that when the vehicle has arrived at the point of interest, the destination, or the address, the driver may not be notified of arrival if the single point is too small. The problem is caused by the fact that intersection with the single point is not detected by the navigation system if the point is displaced either off of the road or beyond the actual physical location being represented. A solution to the problem has been to enlarge the area of the single point in an attempt to ensure intersection. A problem created by enlarging the single point area is that the notification relayed to the driver occurs before the driver has reached the point of interest, the destination, or the address. Therefore, using current methods, the driver is either not notified at all of arrival, is notified too soon, or is notified too late.

It would be desirable to produce a navigation system for a vehicle including a method of representing a point of interest, a destination, or an address in a database which militates against a driver not being notified upon arrival at the point of interest, the destination, or the address.

SUMMARY OF THE INVENTION

Consistent and consonant with the present invention, a navigation system for a vehicle which includes a method of representing a point of interest, a destination, or an address in a database which militates against a driver not being notified upon arrival at the point of interest, the destination, or the address has surprisingly been discovered. The method for representing a location in a vehicle navigation system comprises the steps of: identifying the single location within the database of the navigation system for the vehicle; representing the single location within the database using a plurality of points; determining arrival at the single location by sensing an intersection between the vehicle and at least one of the plurality of points; and notifying a driver of arrival at the single location.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DETAILED DESCRIPTION OF THE PREFERRED EMBODIMENTS

Figure 1:
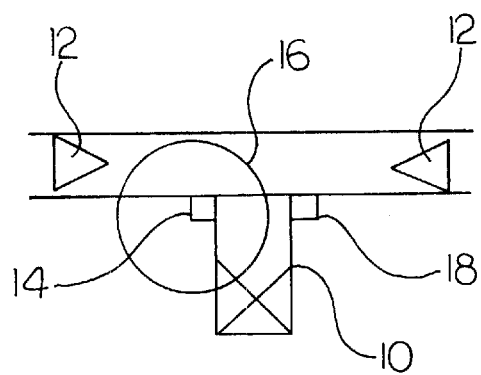
FIG. 1 is a schematic view of a prior art method of representing a location by a single point in a database for a vehicle navigation system.

Referring now to the drawings, and particularly FIG. 1, there is shown a prior art method of representing a location 10 in a database for a navigation system in a vehicle 12. In the method of the prior art, the location 10 is represented by a point 14. The point 14 has an area 16 which relates to the point 14 within the database for the navigation system. A global positioning system (GPS) is used to provide vehicle 12 location information to the database. When the vehicle 12 enters the area 16 relating to the point 14, a driver of the vehicle 12 is notified that the vehicle 12 has arrived at the location 10. Notification of the driver can be made using an audible signal or a visual signal, for example. The location 10 may have an alternative entrance 18. As illustrated, the alternative entrance 18 lies outside of the area 16 relating to the point 14. Therefore, the driver may be incorrectly notified of arrival at the location 10 if the driver desires to reach the alternative entrance 18.

Figure 2:
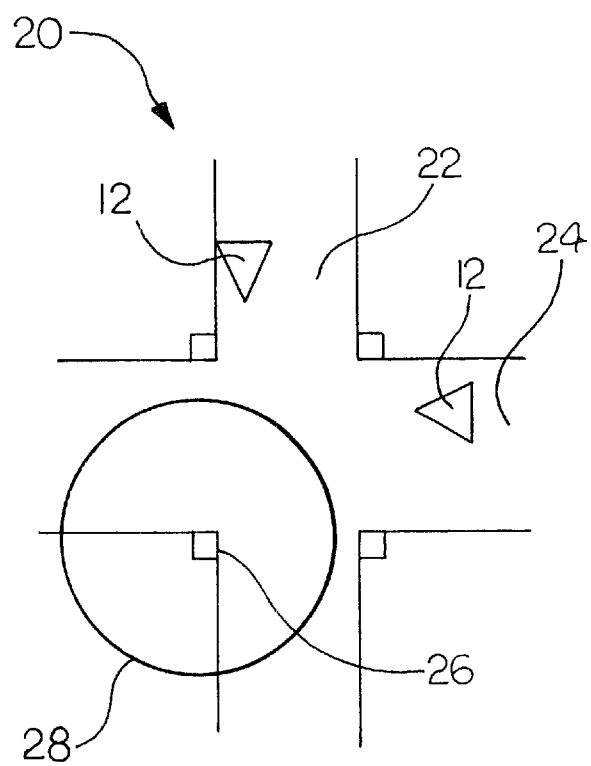
FIG. 2 is a schematic view of a prior art method of representing an intersection by a single point in a database for a vehicle navigation system.

An intersection 20 of a first street 22 and a second street 24 is illustrated in FIG. 2. The intersection 20 is represented by a point 26 assigned to the intersection 20. The point 26 has an area 28 which relates to the point 26 within the database for the navigation system. When the vehicle 12 enters the area 28 relating to the point 26, a message is displayed to a driver of the vehicle 12 that the vehicle 12 has arrived at the intersection 20. As illustrated, some portions of the intersection 20 lie outside of the area 28 relating to the point 26. Therefore, the driver of the vehicle 12 may pass from the first street 22 to the second street 24, or from the second street 24 to the first street 22 without being notified of arrival at the intersection 20. Additionally, the driver could pass through almost the entire intersection 20 before being notified of arrival, thereby notifying the driver too late.

Figure 3:
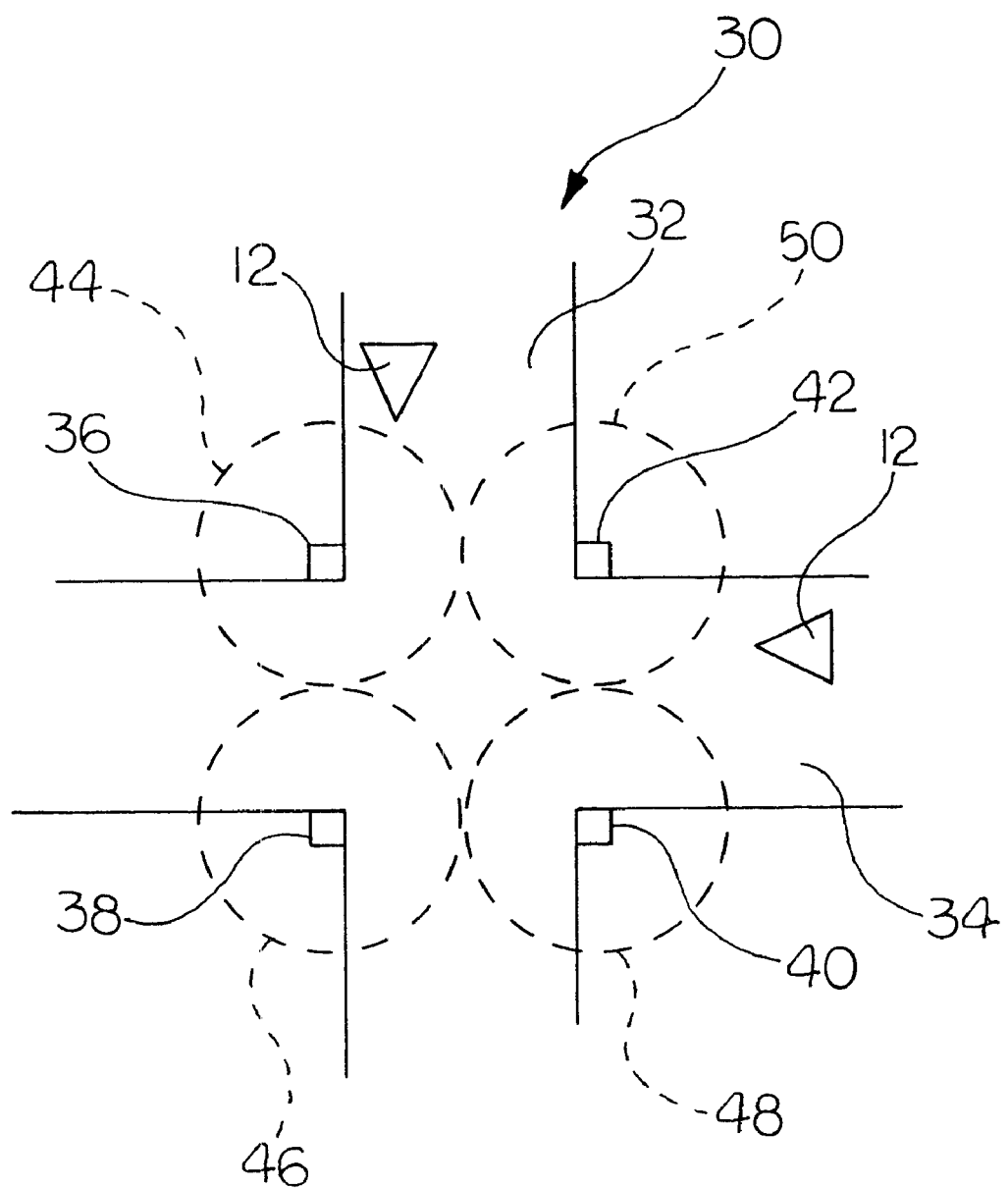
FIG. 3 is a schematic view of a method of representing an intersection by multiple points in a database for a vehicle navigation system incorporating the features of the invention.

Referring now to FIG. 3, there is illustrated generally at 30 an intersection to be represented within the database of the navigation system in the vehicle 12 incorporating the features of the invention. The intersection 30 has a first street 32 and a second street 34. In the database of the navigation system, the intersection 30 is represented by a first point 36, a second point 38, a third point 40, and a fourth point 42, one point at each corner of the intersection 30, respectively. The first point 36 has a first area 44 which relates to the first point 36 within the database for the navigation system. Similarly, the second point 38 has a second area 46, the third point 40 has a third area 48, and the fourth point 42 has a fourth area 50. Although shown as intersecting, it is understood that the first area 44, the second area 46, the third area 48, and the fourth area 50 do not have to intersect. Additionally, the first area 44, the second area 46, the third area 48, and the fourth area 50 are shown as circular, however, it is understood that other area shapes could be used without departing from the scope and spirit of the invention.

By positioning the first point 36, the second point 38, the third point 40; and the fourth point 42 as shown, the intersection 30 is more accurately represented. In other words, when the vehicle 12 enters the intersection 30, the navigation system will correctly notify the driver that the vehicle 12 has arrived at or entered the intersection 30. Additionally, a more accurate position of the vehicle 12 within the intersection 30 can be determined and reported to the driver.

Figure 4:
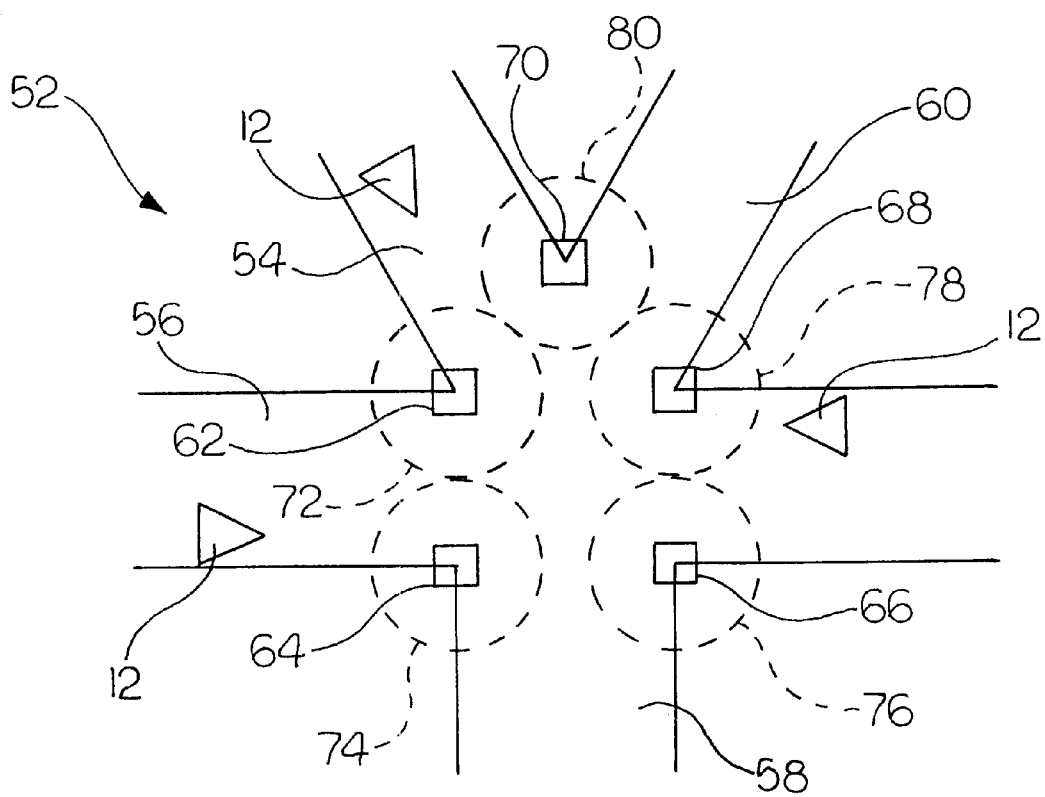
FIG. 4 is a schematic view of a method of representing an intersection by multiple points in a database for a vehicle navigation system incorporating the features of the invention.

A use of the invention for a more complex intersection 52 is illustrated in FIG. 4. The intersection 52 of a first street 54, a second street 56, a third street 58, and a fourth street 60 is shown. Using the method of the prior art illustrated in FIG. 2, a large portion of the intersection 52 could not be covered by a single point. However, coverage of the intersection 52 is accomplished with a plurality of points using the method of the invention. A first point 62, a second point 64, a third point 66, a fourth point 68, and a fifth point 70 are used to designate each corner of the intersection 52. The first point 62 has a first area 72 which relates to the first point 62 within the database for the navigation system. Additionally, the second point 64 has a second area 74, the third point 66 has a third area 76, the fourth point 68 has a fourth area 78, and the fifth point 70 has a fifth area 80. Each of the areas relates to the respective point within the database for the navigation system.

Figure 5:
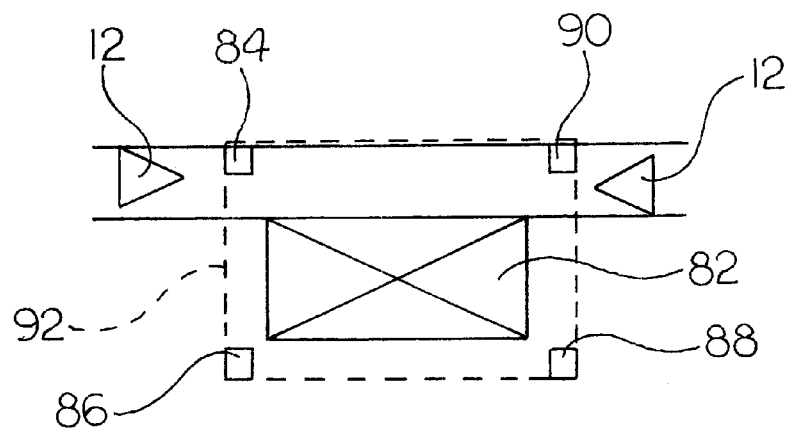
FIG. 5 is a schematic view of an alternate embodiment of the present invention wherein a plurality of points are used to represent a location, the plurality of points forming a polygon in a database for a vehicle navigation system.

An alternate embodiment of the invention is illustrated in FIG. 5. A location 82 is represented by a first point 84, a second point 86, a third point 88, and a fourth point 90. The first point 84, the second point 86, the third point 88, and the fourth point 90 are joined to form a polygon 92, illustrated as a rectangle in FIG. 5. The polygon 92 can be represented in the database of the vehicle 12 navigation system by an algorithm, for example. When the vehicle 12 enters the polygon 92, a message is displayed by the navigation system of the vehicle 12 that the vehicle 12 has reached the location 82. Additionally, the alternate embodiment of FIG. 5 and the method of the embodiment described in FIGS. 3 and 4 can be combined to provide both general and detailed information to the driver regarding the location. For example, information can be relayed to the driver when the vehicle 12 enters the polygon 92, and additional information can be relayed to the driver about the first point 84, the second point 86, the third point 88, or the fourth point 90 as desired. The additional information can include alternative entrances, for example.

Some advantages are experienced by using the navigation system incorporating the features of the invention. One advantage is that a large or complex destination, point of interest, or address is more accurately represented within the database of the navigation system of the vehicle 12. Consequently, more accurate representations and messages can be relayed to the driver of the vehicle 12 resulting in safe and accurate travel. Another advantage is efficiency for the driver since the driver can be taken directly to a desired entrance of a large building. Yet another advantage is accuracy of information relayed to the driver.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for representing a single location in a database of a navigation system for a vehicle comprising the steps of:
   storing the single location within the database of the navigation system for the vehicle;
   representing the single location within the database using a plurality of points;
   determining arrival at the single location by sensing an intersection between the vehicle and at least one of the plurality of points; and
   generating a notification of arrival at the single location.

2. The method of claim 1 wherein said points are within a peripheral boundary of the single location.

3. The method of claim 1 wherein said notification is a visual signal.

4. The method of claim 1 wherein said notification is an audible signal.

5. The method of claim 1 wherein said points form a polygon.

6. A method for representing a single location in a database of a navigation system for a vehicle comprising the steps of:
   storing the single location within the database of the navigation system for the vehicle;
   representing the single location within the database using a plurality of areas;
   determining arrival at the single location by sensing an intersection between the vehicle and at least one of the plurality of areas; and
   generating a notification of arrival at the single location.

7. The method of claim 6 wherein said areas are within a peripheral boundary of the single location.

8. The method of claim 6 wherein said notification is a visual signal.

9. The method of claim 6 wherein said notification is an audible signal.

10. The method of claim 6 wherein said areas have a circular shape.

11. The method of claim 6 wherein said areas form a polygon.

12. A method for representing a location in a database of a navigation system for a vehicle comprising the steps of:
    storing the location within the database of the navigation system for the vehicle;
    representing the location within the database using a plurality of points, each of the plurality of points having an associated area surrounding each of the plurality of points;
    determining arrival at the location by sensing an intersection between the vehicle and at least one of the areas associated with the plurality of points; and
    generating a notification of arrival at the location.

13. The method of claim 12 wherein said points and said associated areas are within a peripheral boundary of the location.

14. The method of claim 12 wherein said notification is a visual signal.

15. The method of claim 12 wherein said notification is an audible signal.

16. The method of claim 12 wherein said points and said associated areas form a polygon.

* * * * *